2,820,548

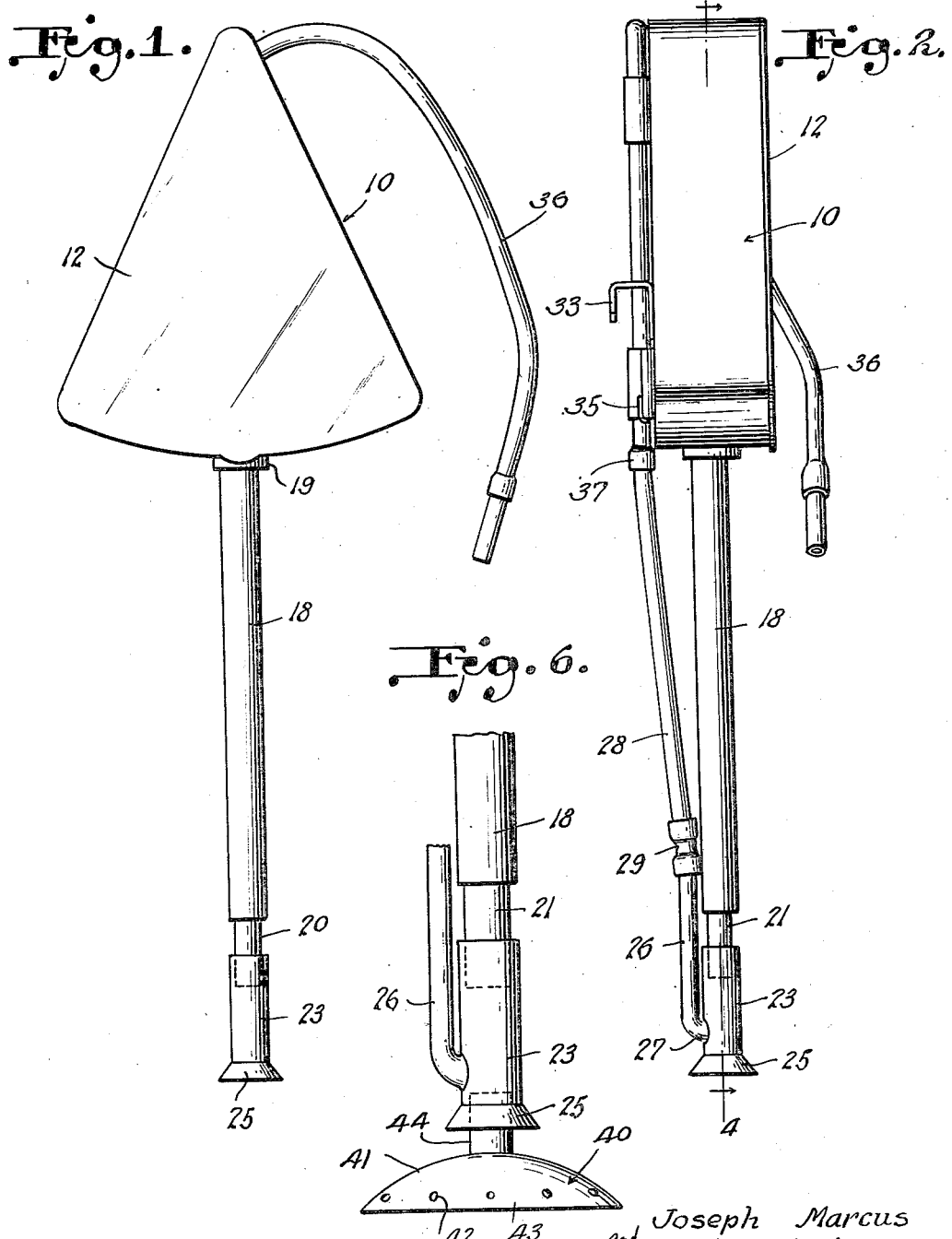

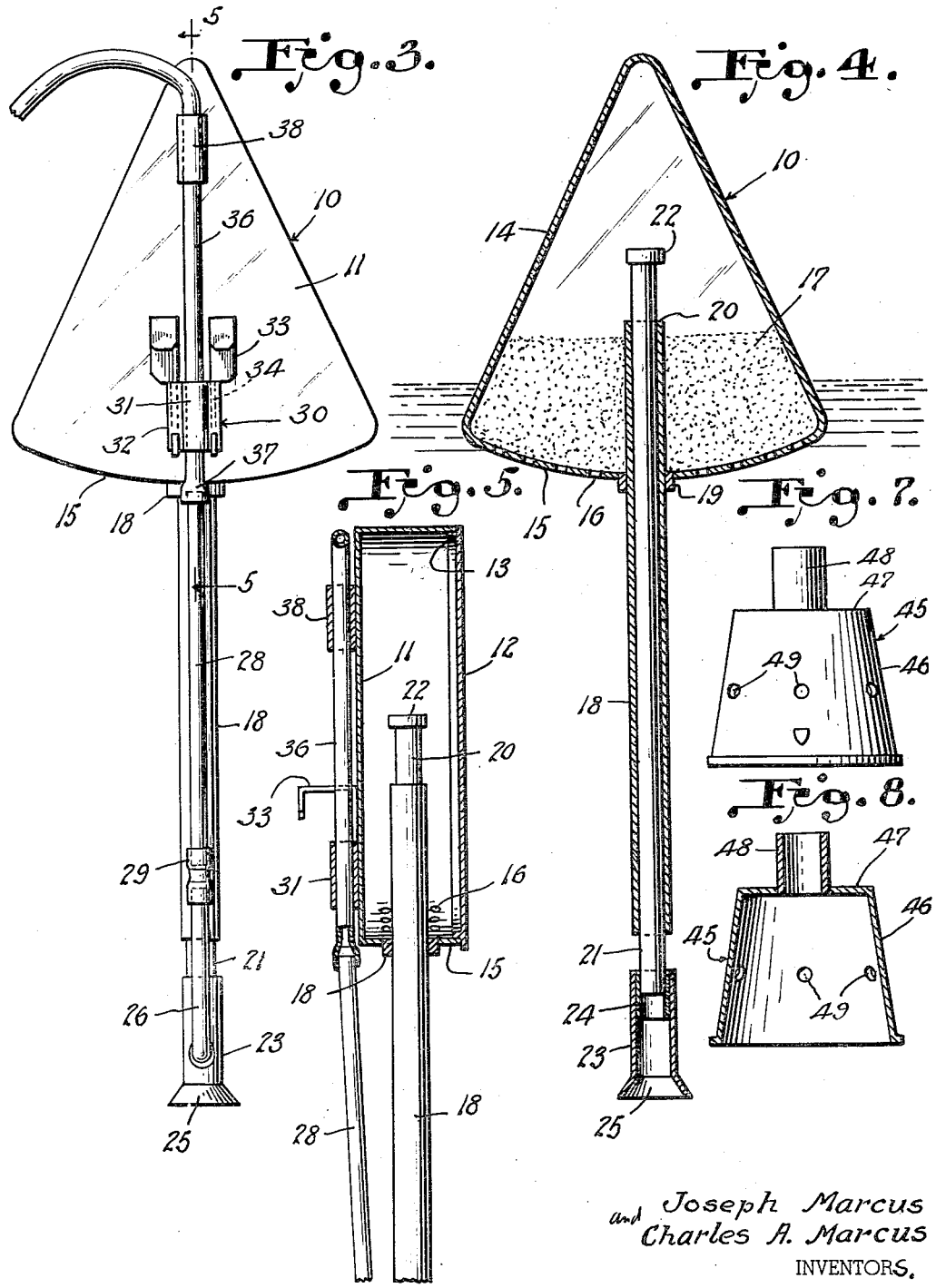

SYPHON AND FILTERING MEANS FOR AN AQUARIUM

Joseph Marcus and Charles A. Marcus, Brooklyn, N. Y.

Application February 14, 1957, Serial No. 640,155

4 Claims. (Cl. 210—169)

This invention relates to an improved syphon and filtering means for an aquarium.

An object of this invention is to provide a syphon and filter which is adapted to be mounted in a tank and connected to an air pump so that the water in the tank may be aerated and simultaneously filtered.

Another object of this invention is to provide a combined syphon and filter which may be used with a perforated suction feed adapted to be extended into the sand in the bottom of the aquarium whereby the water is filtered by the sand and also by the filtering medium.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings:

Figure 1 is a detail inner side elevation of the syphon and filtering means constructed according to an embodiment of this invention.

Fig. 2 is an end elevation of the device.

Fig. 3 is an outer side elevation of the device.

Fig. 4 is a vertical sectional view taken substantially on the line 4—4 of Fig. 2.

Fig. 5 is a fragmentary sectional view taken substantially on line 5—5 of Fig. 3.

Fig. 6 is a detail end elevation on an enlarged scale showing the power portion of the device with a filtering member disposed on the lower end.

Fig. 7 is a detail side elevation of a modified form of filter.

Fig. 8 is a vertical section taken through the filter shown in Fig. 7.

Referring to the drawings, the numeral 10 designates generally a filtering housing which is formed of vertical walls 11 and 12, the latter being removable and formed with a marginal flange 13. The housing 10 also is formed of upwardly converging side walls 14 and the lower divergent ends of the side walls 14 are connected together by an arcuate bottom wall 15 which is formed with a plurality of holes 16. The housing 10 as shown in the drawings, is of sector shape and a filter medium 17 is adapted to be disposed in the lower portion of housing 10. A vertically disposed tube 18 extends through a boss 19, being fixed relative to the boss 19. The upper end of the tube 18 terminates as indicated at 20 at a point slightly above the top of the filter medium 17. An adjustable tube 21 is slidable within the tube 18 being provided with an open upper end and with an annular collar 22 fixed on the upper end thereof. The collar 22 provides a means for limiting the downward projection of extension of tubular member 21 below the lower end of tubular member 18. A short tube 23 is removably mounted on the lower end of tube 21 and preferably an intermediate tube 24 is fixed within the upper end of tube 23 and frictionally engages about the lower end of tube 21. A frusto-conical intake member 25 is formed at the lower end of the tube 23 and is adapted to be positioned either within the sand at the bottom of an aquarium or at a point closely adjacent the upper surface of the sand.

In order to provide a means whereby water and air may be discharged into the lower tubular member 23, I have provided an air duct 26 which as shown in Figs. 2 and 3, is provided with a bend 27 at the lower end thereof which is fixed to the lower tubular member 23. An upwardly projecting duct or tube 28 is connected at its lower end by means of a connecting sleeve 29 to the upper end of duct 26 and preferably the sleeve 29 is flexible so that this sleeve may be bent and tubular member 28 may be extended upwardly and outwardly, as shown in Fig. 2.

A supporting bracket structure is secured to the outer wall 11 of housing 10, the bracket structure being generally indicated at 30. This bracket structure 30 includes an intermediate tubular member 31 with a pair of outer tubular members 32. These tubular members 31 and 32 are fixed to the outer wall 11 and a pair of hooks 33 extend upwardly from the outer tubular members 32. These hooks 33 are formed with shanks 34 extending through the outer tubular members 32 and the lower ends of the shanks 34 are bent upwardly and outwardly, as indicated at 35. The hooks 33 are adapted to engage over the upper edge of an aquarium so as to suspendingly support the filter and aerating structure within the water of the aquarium. A tube 36 extends downwardly through the intermediate tube 31 and is provided at its lower end with a connector 37 which engages over the upper end of tubular member 28. Tubular member 36 also engages through an upper guide or tube 38 which is fixed to the outer wall 11 adjacent the upper portion thereof. Tube 36 is relatively flexible and the outer end thereof is adapted to be connected to an air pump, whereby air is forced downwardly through tubular members 36, 28 and 26, into suction head or tube 23. When the air is discharged into the suction head or tubular member 23 the air will rise upwardly passing through tubular member 21 and will force water upwardly through tubular member 21 into the housing 10. This water will then filter downwardly through the filtering medium 17 and will turn through the opening 16 back into the water within the aquarium.

Referring now to Fig. 6, there is disclosed a filter attachment generally indicated at 40 which is mounted within the lower end of the tubular member 23. The filter member 40 is formed of a dome-shaped member 41 having openings 42 adjacent the lower edge 43 thereof and the dome-shaped member 41 is adapted to be substantially embedded within the sand within the bottom of the aquarium. A nipple 44 extends from the top of the dome-shaped member 41 and is adapted to telescope partly into the lower end of tubular member 23.

Referring now to Figs. 7 and 8, there is disclosed another form of filtering bell, generally indicated at 45. The filtering bell 45 is formed of a frusto-conical body 46 having a top wall 47 with a nipple 48 extending from the top wall 47. Nipple 48 is adapted to telescope into the lower end of tubular member 23. The frusto-conical member 46 is provided between the ends thereof with holes 49 through which water is adapted to flow.

The syphon and aerating structure hereinbefore described is adapted to be formed of plastic or similar material which may be relatively light in weight and preferably of a transparent characteristic. The syphon heretofore described will not only provide a means for filtering the water, but will also provide a means for effecting aeration of the water. When the filter medium 17 becomes substantially clogged, a new filter medium may be inserted in the housing 10 by removing the closure 12 which is frictionally held on the inner side of the housing 10.

What is claimed is:

1. A combined syphon and filter for aquariums comprising a housing having a perforate bottom wall, means suspending said housing from a wall of the aquarium, a filter means in said housing, a tube extending downwardly from said housing, a second tube slidable in said first tube and terminating at its upper end in said housing above said first tube, the lower end of said second tube projecting below the lower end of said first tube, a dome-shaped intake member, a sleeve carried by said intake member engaging over the lower end of said second tube, and a flexible tubular air line secured at one end to said sleeve and adapted to be secured at the other end thereof to an air pressure means.

2. A combined syphon and filter as set forth in claim 1, wherein said suspending means comprises a pair of downturned hooks.

3. A combined syphon and filter as set forth in claim 1, wherein said intake member is formed with holes above the lower edge thereof.

4. A combined syphon and filter as set forth in claim 1, wherein said intake member is of frusto-conical shape.

No references cited.